US012488558B1

(12) United States Patent
Konduru

(10) Patent No.: US 12,488,558 B1
(45) Date of Patent: Dec. 2, 2025

(54) SYSTEMS AND METHODS FOR ENCODING SENSOR DATA TAGGED WITH GEOLOCATION DATA

(71) Applicant: Zoox, Inc., Foster City, CA (US)

(72) Inventor: Pranav Kumar Konduru, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 346 days.

(21) Appl. No.: 18/309,649

(22) Filed: Apr. 28, 2023

(51) Int. Cl.
*G06V 10/62* (2022.01)
*G06V 10/74* (2022.01)
*G06V 20/56* (2022.01)

(52) U.S. Cl.
CPC ............ *G06V 10/62* (2022.01); *G06V 10/761* (2022.01); *G06V 20/56* (2022.01)

(58) Field of Classification Search
CPC ....... G06V 10/62; G06V 10/761; G06V 20/56
See application file for complete search history.

(56) References Cited

U.S. PATENT DOCUMENTS

2016/0283804 A1\* 9/2016 Furman ................. G01C 21/30
2020/0068199 A1\* 2/2020 Sadacharam .......... H04N 19/44
2020/0348665 A1\* 11/2020 Bhanushali .......... H04N 19/167

\* cited by examiner

*Primary Examiner* — Vu Le
*Assistant Examiner* — Rachel Anne Ometz
(74) *Attorney, Agent, or Firm* — EIP US LLP

(57) ABSTRACT

This disclosure describes procedures, as well as methods, systems and computer-readable media for compressing sensor data such as video data. In many use cases, such as for fully or semi-autonomous vehicles (AV), a sensor is moving through an environment multiple times, capturing data. This may result in that a same part of the environment is captured several times, and compression can be aided by the fact that for some environments, many of the structures and objects in the environment stays the same over time.

20 Claims, 7 Drawing Sheets

SYSTEMS AND METHODS FOR ENCODING SENSOR DATA TAGGED WITH GEOLOCATION DATA

BACKGROUND

A vehicle may include various sensors, which may be utilized for many different purposes. Sensor data produced by these sensors may need to be transmitted from the vehicle and stored for later analysis, mining, training of algorithms or for legal purposes, making digital encoding of various sensor data increasingly important. For example, high-efficiency image compression may be needed to keep the quality that can be obtained from stored sensor data while at the same time reducing the required storage space.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
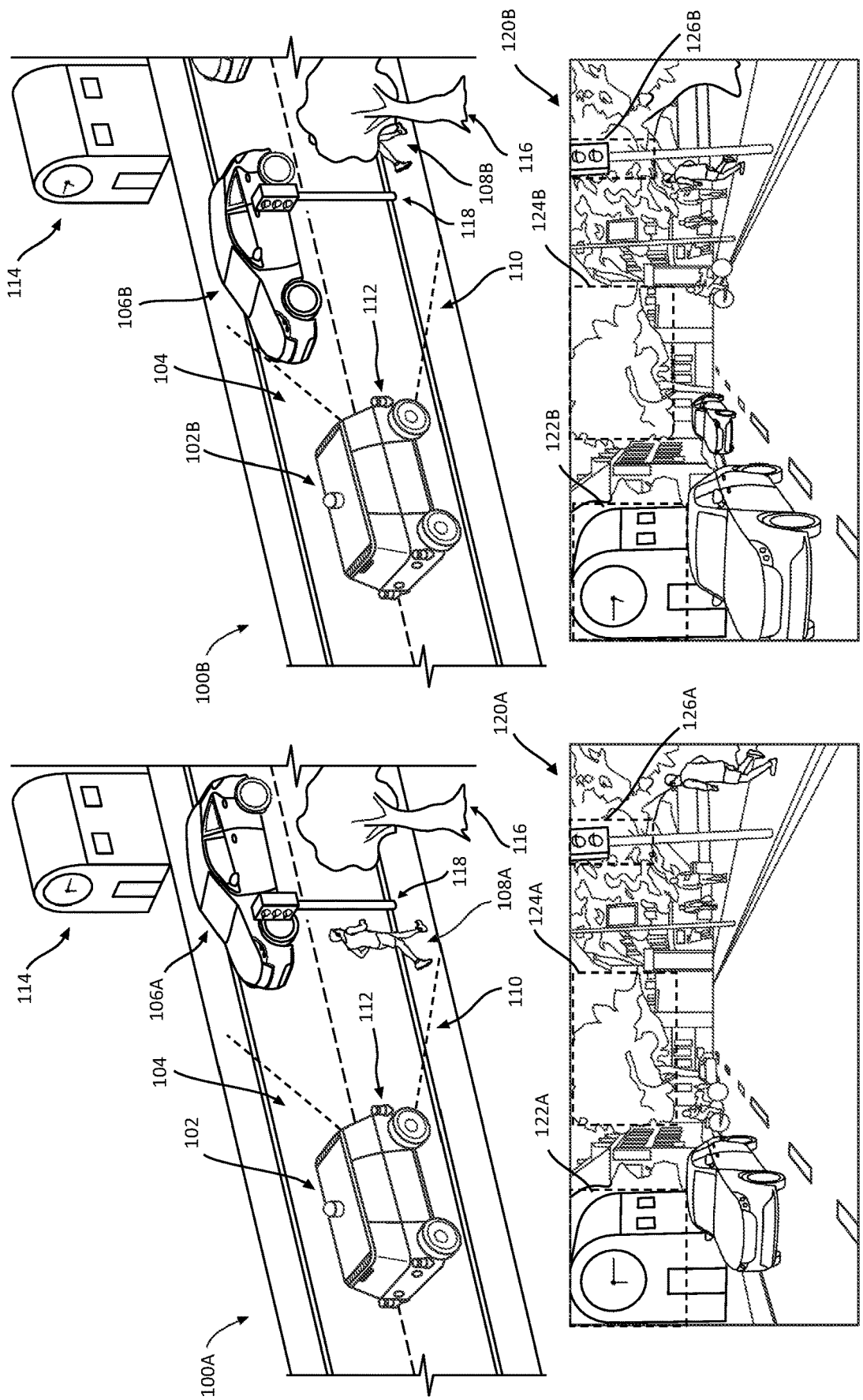
FIG. 1 shows a vehicle passing through the same environment twice, at two different times. In each run, the camera of the vehicle captures an image at a specific coordinate in the environment.

This disclosure describes procedures, as well as methods, systems and computer-readable media for compressing sensor data such as video data. In many use cases, such as for fully or semi-autonomous vehicles (AV), a sensor is moving through an environment multiple times (referred herein as "runs"), capturing data. This may result in a same part of the environment being captured several times, and compression can be aided by the fact that for some environments, many of the structures and objects in the environment stays substantially the same over time. Traditional compression algorithms work by compressing video as an independent file, where data for a specific frame may be compressed by referencing nearby frames in the video sequence and encoding a residual image. Using the techniques described herein, at least for a portion of a specific image frame (or other sensor data), an image frame captured on a same or similar location in the environment in a previous (or later) run may be used as a reference frame. With these techniques, the data compression ratio of sensor data may be improved. Moreover, depending on a determined importance of objects or areas of the environment, a more or less strict similarity requirements for referencing sensor data from a previous run may be applied. In this way, a flexible approach to sensor data compression may be achieved, for example facilitating that objects that are crucial for decision-making in an autonomous vehicle's planning component may be compressed without any loss of information while other objects or structures may be compressed with some loss of information. In other words, some objects may be dynamically compressed depending on their use, their important to autonomous driving, etc.

Certain vehicles, such as AVs, may include one or more sensors, such as a light detection and ranging (LIDAR) sensor, radar sensor, camera or microphone to gather information of the environment being traversed by the AV. Sensor data may for example comprise visual information (such as images), spatial information (such as point clouds) or temporal information (such as a video sequence) relating to the environment traversed by the AV. In some examples, a combination of different data may be used, such as for example audiovisual data including both images/video and audio. The sensor data captured by the one or more sensors may be analyzed and used to control the AV. For example, sensor data may be analyzed to detect other vehicles, pedestrians, traffic direction features, road lanes, etc., in the environment. Even if the analysis for real time control of the AV may take place onboard the AV, sensor data (point cloud, audio, video, images) from the one or more sensors may need to be transmitted from the AV to e.g., a remote computing device to be compressed and stored for further analysis, data mining, simulations to be used as training data for machine learning algorithms, or for legal purposes.

Not all sensor data captured by a sensor may be equally important, depending on the context in which the sensor data will be used or the context in which the sensor data is captured. For example, in the context of an AV, video input from the vehicle's cameras may be used to detect and track objects in the environment, such as other vehicles, pedestrians, and traffic signs. This information may then be used by the vehicle's control system to make decisions about how to navigate the environment safely. However, the cameras may capture much more of the surroundings other than such objects, for example buildings, vegetation, the sky, etc., which are not as important for controlling the vehicle, and may be less important also for the reasons as to why storing thereof is performed (e.g., remote analysis, for legal purposes, etc.). Moreover, other information associated with the sensor data may influence the importance of the sensor data. Such other information may comprise driving scenarios, for example the scenario where the AV is making an unprotected left turn or the scenario where the AV is requiring teleoperation assistance to control the AV. A detected difference between map data and the captured sensor data (for example a pothole or cones/barricades surrounding a road work) may result in that the sensor data may be considered important. Moreover, internal logs relating to e.g., functionality of the AV, debug messages of the AV, or operations of the AV may be used to determine importance of the sensor data.

With the increased use of AVs, the amount of storage space needed for storing the sensor data received from the AVs also increases. Moreover, for certain environments, multiple AVs will traverse the environment on a same route several times during e.g., an hour, a day, a week, etc., and in some cases even a single AV will traverse the environment on a same route multiple time during e.g., an hour, a day, a week, etc. Gathering sensor data during a plurality of runs may potentially result in that a static portion of the environment, which is represented by similar sensor data captured at separate occasions in time (e.g., one or more times per run), is individually compressed in a multiple of compressed files. Moreover, unimportant semi-static portions of the environment, such as vegetation, the sky, etc. may also occupy unnecessary amount of storage space and may have little consequence for autonomous driving functions.

Consequently, it may be advantageous to provide a compression technique that allows for an improved data compression ratio for sensor data representing a same area of an environment but captured on separate occasions in time. Moreover, it may be advantageous to provide an encoding technique that allows for adaptive data compression ratio for various parts (portions, subsets, etc.) of the sensor data, such as for example different areas of an environment depicted in an image. This may advantageously be achieved by determining sensor data captured during a first run that corresponds to sensor data captured during a second run by at least comparing geolocation data associated with the first and second sensor data.

As used herein, geolocation data refers to data that indicates coordinates in the environment that the sensor data was captured. During a plurality of runs, a same or corresponding sensor at each run may capture substantially the same area of the environment each time that a vehicle passes the same coordinate in the environment. Geolocation data thus refers to information that identifies the geographic location of the sensor and can be used to find corresponding sensor data between runs. It is typically obtained using Global Positioning System (GPS) or other positioning technologies and can include information such as latitude, longitude, and altitude.

The sensor, or other components in the vehicle such as a perception component described below, may be configured to associate sensor data with geolocation data. The geolocation data may be considered to describe contextual information about the first sensor data. The geolocation data may be used to determine the coordinates of the environment where an image frame (or other sensor data) was captured. The sensor data may be associated with further metadata indicating contextual information about the first sensor data. The contextual information may describe content of the sensor data, such as object identifiers of objects of the environment captured in the first sensor data. The contextual information may further indicate configuration data relating to a sensor capturing the first sensor data, for example identifying which sensor captured the sensor data, the type of sensor, the mounting location of the sensor, the direction of the sensor, the field of view or angular coverage of the sensor, etc. The contextual information may further indicate weather conditions in the environment while capturing the first sensor data. The contextual information may further indicate a time of day when the first sensor data was captured. The contextual information may further indicate a time of year when the first sensor data was captured.

The sensor data may in some examples be labeled. For example, each portion (patch, area, etc.,) of an image may be labeled with one or more labels. Each label may indicate one or more of: an image content type of the portion; motion data indicating motion detected in the environment represented by the portion; importance data indicating an importance of data content of portion for controlling an operation of the AV traversing the environment when the image was captured, logs of the AV relating to the period of time when the image was captured, or driving scenarios of the AV during the period of time when the image was captured. In some examples, such labeling can be determined using a perception component or planner component (as will be further described below) of the AV. For example, a relative importance of the data content of a portion may be determined based at least in part on one or more labels associated with that portion. For example, an importance of a label may be determined using a predefined lookup table or any other type of heuristics, or by inputting one or more of the labels into a ML model trained to determine the importance of a classification.

In other examples, importance of a portion of sensor data may be determined using other types of data relating to the sensor data. For example, in examples the sensor data is an image. Other types of data, such as audio data or map data may be used to determine portions of the image that have higher relevance compared to other portions of the image. In examples, audio may indicate a portion of the scene captured by the image where people or emergency vehicles are present. In these examples, image content corresponding to that portion of the scene may be considered important. Map data may identify static objects in the environment, for example buildings, bridges, or other landmarks, and may advantageously be used to determine importance of a portion of sensor data.

The above examples of labeling portions of an image can be used for other types of data with the necessary changes. For point clouds, a portion of a point cloud may refer to a subset of points within the point cloud that form a local region. These points may be chosen based on certain criterion, such as proximity or similarity, and may be used for various tasks such as feature extraction, object recognition, and object tracking. A portion of an audio signal may refer to a subset of samples of an audio signal that form a local region. These samples may be chosen based on a certain criterion, such as time, frequency, or amplitude, and may be used for various tasks such as audio feature extraction, audio classification, and audio synthesis.

In some examples, first sensor data is available (e.g., received from an AV) at the remote computing device for compression and subsequent storage. The sensor data may be associated contextual metadata, for example geolocation data indicating coordinates in the environment where the sensor data was captured as described above. The sensor data may comprise an image, a point cloud from a Light Detection and Ranging (LIDAR) sensor or radar, etc. The sensor data may also comprise parts of the above data sets, such as segmented data or portions of data from the image, the point cloud, etc.

In some examples, the first sensor data comprises first image data received from a camera of a vehicle traversing an environment during a first period of time. The first image data may be associated with first geolocation data indicating coordinates in the environment where the first image data was captured. In some examples, an image segmentation algorithm or object detection algorithm may be applied to the received image to determine the first image data. In this way, objects may be extracted from the image, which may simplify finding suitable second image data to refer to for the first image data. Similar segmentation may be applied to e.g., radar data or LIDAR data, to identify objects is the point clouds.

In the below, image data will be used as an example of the sensor data. However, it should be noted that the compression techniques described below may apply to other types of sensor data, such as radar data, LIDAR data, etc.

To aid compression of the first image data, second image data may be retrieved and evaluated for the purpose of being referred to when compressing the first image data. The second image data may be captured during a second period of time. The second period of time may be different from the first period in time, such as for example previous or later compared to the first period of time. The second sensor data may be associated with second metadata indicating contextual information about the second sensor data, the second metadata comprising second geolocation data indicating coordinates in the environment where the second sensor data was captured. For example, the first image data may be captured during a first run of an AV traversing an environment, and the second sensor data may be captured during a second run by a same or different AV traversing the same environment.

In some examples, the second image data is determined from a storage (e.g., a database) comprising a plurality of stored image data. The second image data may be determined based at least in part of the first geolocation data, such that the second image data being captured at coordinates in the environment differing with less than a threshold distance from the coordinates indicated by the first geolocation data. The threshold distance may be any suitable distance such that the environment captured by the second image data at least partly overlaps with the environment captured by the first image data. In some examples, further contextual information associated with the first image data is used to determine a suitable second image data to refer to when compressing the first image data. For example, the contextual information associated with the first image data may comprise information such as weather conditions in the environment while capturing the first image data, a time of day when the first image data was captured, object identifiers of objects of the environment captured in the first image data, and/or configuration data relating to a camera capturing the first image data may be used. Each of the plurality of stored image data may be associated with corresponding contextual information. The second image data may be determined by parameterizing the contextual information of the first image data and the corresponding contextual information of the stored image data and make a comparison between the respective contextual information's to determine a suitable second image data to refer to when compressing the first image data. For example, the respective parameterized information may be mapped to a multi-dimensional space. A second image data may be selected if the distance between its parameterized contextual information and the parameterized contextual information of the first image data is less than a threshold distance in the multi-dimensional space. Any other suitable strategy for comparing the contextual information of the first image data with the contextual information of the second image data may be used, for example using heuristics (e.g., the difference between different contextual information may have to meet certain requirements, at least a defined percentage of the contextual information must meet a defined requirement, etc.)

In examples, images can be stored in a database associated with respective contextual information comprising geolocation data. The stored contextual information can be used for matching with contextual information associated with the first image data. For example, each stored image data with geolocation data matching the geolocation data of the first image data may have been captured during different runs of an AV/AVs traversing the same environment at a different time. In some examples, the stored image data having the most similar contextual information compared to the contextual information of the first image data, as described above, may be selected. In some examples, the stored image data being most similar to the first image data may be determined and used as the second image data. The most similar stored data may be determined using any suitable type of similarity measure depending on the type of the sensor data. For example, measures like Mean Square error, Structural similarity index or any feature-based method may be used. In some examples, the similarly measure of the selected image data may need to meet a set threshold similarity. Put differently, the selected image sensor data may need to differ to the first image data with less than a set dissimilarity threshold in order to be used as the second image data and thus used to aid compression of the first image data as discussed herein. As should be understood, the preceding similarity determination can be based on any appropriate portion of sensor data (e.g., a portion of an image frame corresponding to a static object).

The dissimilarity threshold for finding suitable data to aid compression may depend on the content or labels of the first image data. In examples, a portion of the first image data (or the entire first image data) may be labeled as described above, and the label may be used to determine the image dissimilarity threshold for the portion of the first image data or for the entire first image data. As such, the image dissimilarity threshold may vary over a plurality image data, facilitating lossless and/or lossy compression and varying compression ratios for different image data.

The label may be received as metadata associated with the image data. The label may be determined by components of the AV when the camera is capturing the image data. The label may in other example be determined at the remote computing device that perform compression of the image data for storage reasons. The remote computing device may thus have components configured to perform analysis of the received image data. In some examples, the remote computing device may label the image data based on an intended use for the portion of the first image data. For example, if the image data is to be stored for a reason requiring lossless compression, the label may indicate this such that the data dissimilarity threshold is adapted accordingly, or such that lossless compression is ensured for the portion, e.g., by always determining a difference data set between the portion of the first image data and the portion of the second image data and including a lossless compressed difference data set in the compressed image data.

A label may indicate the image content type of the portion of the first image data. For example, the image content type may refer to object classification data, identifying an object type that the portion of the first image data relates to. For example, an image captured by a camera mounted on an AV may depict vehicles, pedestrians, animals, road signs, traffic lights, buildings, vegetation, road markings, etc. Some of these objects may be more important to store with a higher quality than others. In some examples, objects that may influence driving behavior of an AV may need to be stored with a higher quality, such that verification of the decisions made by the AV can be performed if needed. Such object type(s) may be predetermined, or be based on the AV behavior while gathering the image data, or be based on the object location in the environment, etc. In some examples, static objects, e.g., objects that does not move in the scene, possibly belonging to certain object types, may be determined to be of less importance. Consequently, the similarity requirements for referencing image data from a previous run may be relaxed for the portion of the sensor data relating to such objects.

A label may further indicate driving scenarios of the AV while capturing the first image data. For example, in case the AV required teleoperation assistance during the period of time when the first image was captured, or in close connection to such period of time, it may be important for reviewing purposes or legal purposes to store the image data in high quality (e.g., lossless). The driving scenarios and their respective importance level may be defined in e.g., a lookup table. Consequently, the similarity requirements for referencing image data from a previous run may be relaxed or become stricter or more stringent based on the driving scenario.

A label may further indicate content of logs of the vehicle relating to the first period of time, i.e., at the time, or close in time, when the first image was captured. Such logs may include e.g., error logs, debug logs etc. Consequently, the similarity requirements for referencing image data from a previous run may be relaxed or become stricter or more stringent based on the content of such logs.

In some examples, the first image data is compressed by, for an identified object in the first image data, referring to an identified corresponding object in the second image data. In this example, the decision whether to reference the second image data or not is taken on an object level which may reduce the computational complexity and increase encoding efficiency. In other examples, the referencing is done on a macroblock level (or similar encoding units for other types of sensor data), e.g., 8×8 pixels such that the decision of whether to reference the second image data or not is taken on a macroblock level. The macroblock size may be chosen to strike a balance between encoding efficiency and computational complexity. Deciding which of the two strategies to use for a certain image data may be based on labels as described above, as well as on how different the first and second image data is. For objects of certain types, the decision whether to reference the second image data or not may be taken on an object level even if larger difference between the first and second sensor image exists. For objects of other types, the decision whether to reference the second image data or not may be taken on a macroblock level even if the difference between the first and second image data is small.

In examples, a comparison is made between the selected second image data and the first image data to determine a corresponding portion of the first and second image data. As described herein, any suitable approach to identify similar portions between the first and second image data may be used, such as feature based methods, template matching methods, histogram comparison etc. In some examples, digital image stabilization (DIS) or electronic image stabilization (EIS) techniques may be used, for example based on the contextual information such as mounting positions, angle of view, etc. of the respective sensors. The determined portion of the second image data may need to differ with less than an image dissimilarity threshold (defined e.g., as discussed above) from the portion of the first image data. The determined portion of the second image data may be used to aid compression of the first image data.

Compressing the first image data into compressed image data may thus comprise referencing to the determined portion of the second image data in the compressed image data. For example, for the portion of the first image data (macroblock, on an object level, or the entire first image data) a reference to the corresponding portion of the second image data can be included in the compressed image data. The reference may identify the second image data in any suitable way depending on the implementation. For example, the reference may identify the second image data in a storage using an index in the storage and the portion of the second image data may be identified using pixel coordinates.

Advantageously, using the referencing techniques described herein, substantial storage space may be saved, in particular for image data which is considered less important for various reasons as set out herein.

In some examples, the compressing the first image data into compressed image data comprises referring to the second image data and determining a difference data set between the (portion/subset) of the first image data and the (portion/subset) of the second image data. The difference dataset may then be compressed and including in the compressed image data. The difference data set may for example account for differences between the first image data and the second image data. These differences may be the result of changes in the environment between runs, differences in in perspective due to the sensors(s) being at different positions or angles when capturing the first and second image data, etc. Compression of the difference data set may be done using any suitable lossless or lossy compression techniques. The chosen compression technique may in some examples be based on the labels of the portion of the first image data, such that lossless compression is used for objects/portions of the first image data that is considered important for various reasons as set out above.

In some examples, the decision whether to refer to the second image data or not, and in that case, whether to include the difference data in the compressed version of the first image data or not depends on two different data dissimilarity thresholds. Both the data dissimilarity thresholds may vary as described above, i.e., based on a determined importance of the image content of the first image data. In examples, the decision of using the second image data may be based on whether the difference between the portion of the first image data and the corresponding portion of the second image data is less than a first dissimilarity threshold. In case the difference is larger than the threshold, compression without referencing to sensor data captured during a different run may be used. However, if the difference is less than the first threshold, the compression may comprise referencing the second image data (i.e., image data captured at a previous or later run at the same or similar geographical coordinates). In some examples, a second dissimilarity threshold is used. The second dissimilarity threshold may be lower than first dissimilarity threshold. In some examples, if the portion of the first image data and the portion of the second image data differs with more than the second data dissimilarity threshold, the difference data set may be compressed and included in the compressed image data. Put differently, in examples, if the difference is larger than a first dissimilarity threshold, compression of the first portion of the image data does not comprise referencing the second image data. In case the difference is between the first and the second dissimilarity threshold, the compression of the portion of the first image data may comprise determining a difference data set between the portion of the first image data and the portion of the second image data, compressing the difference data set and including the compressed difference data set in the compressed image data. In case the difference is less than the second dissimilarity threshold, the compression of the portion of the first image data comprises referencing the corresponding portion of the second sensor data, without including the difference data set.

These data dissimilarity thresholds may thus vary as discussed above, e.g., based one or more labels pertaining to the portion of the first image data being compressed. For example, in case the label indicates that the portion of the first image data was used for controlling an operation of the AV traversing the environment while it was captured, this may mean that less dissimilarity is allowed compared to if the image data was not used for controlling the operation of the AV. In some examples, referencing the second image data is not permitted at all for some labels, for example if the image data that was used to control the operation of the AV or for an object that moves in the environment.

As mentioned above, the second image data may be retrieved from a storage comprising a plurality of stored image data, each associated with a geolocation data indicating coordinates in the environment where the stored image data was captured. The storage may be seen as a library of image content. For example, captured image data from a city, a certain route in the city, or a part of a route (such as a street) may be stored in the storage to be referred to when compressing newly captured image data from the same city, route or part of route. A stored image data may be indexed using the geolocation data, for easy retrieval. A stored image data may further be indexed using other data such as object type/name, time of capture, position of sensor on AV, type of AV capturing the image data, weather conditions, etc., to simplify the task of finding suitable image data to aid the compression of the first image data. In some examples, in case no suitable image data can be found for the first image data, at least parts of the first image data may be stored in the storage to be used for future reference. For example, in case none of the stored image data that geographically corresponds to the first image data (i.e., same, or similar geolocation data) is similar enough (difference below a set threshold), at least parts of the first image data may be stored in the storage to be used for future reference.

In some examples, the storage comprises stored image data corresponding to objects detected in the images captured by an AV. There are several strategies on how to store an object. For example, the entire image including the object may be stored, together with e.g., an object mask representing the location of the object in the image. This may be useful if analysis of the object in its full context are needed to e.g., determine the most suitable image data to reference to. In other examples, only the region of the image data in which the object was detected is stored.

In other examples, a patch-based method is used. This strategy may involve breaking down the object into smaller parts, or patches. The patches may be collected on different times/runs and may provide robustness to occlusion where parts of the object are obscured or hidden in certain image data.

In some examples, image data of objects of a certain object type is stored, for example image data relating to objects that typically are considered static or of less importance, such as buildings, vegetation, the sky, etc. In some examples, stored image data of an object is anonymized, such that it can be used for privacy reasons. For example, windows in a building or faces of pedestrians may be blurred. The techniques described herein may thus be used for privacy reasons, to reference anonymized image data when compressing the first image data.

The techniques described herein can be implemented in a number of ways to efficiently and in a flexible way compress an image or video stream including the image. Examples are provided below with reference to FIGS. 1-7. Examples are discussed in the context of autonomous vehicles (AV); however, the methods, apparatuses, and components described herein can be applied to a variety of components (e.g., components comprising or controlling surveillance cameras, body camera of law enforcement, traffic cameras, etc.,), and are not limited to autonomous vehicles. In one example, the techniques described herein may be utilized in driver-controlled vehicles. Moreover, examples are discussed in the context of the input data being an input image; however, the methods, apparatuses, and components described herein can be applied to a variety data such as point cloud data or audio data. Furthermore, the techniques described herein can be used with real data (e.g., captured using cameras), simulated data (e.g., generated by a simulator), or any combination of the two.

FIG. 1 illustrates two example scenarios 100A, 100B. Each scenario 100A, 100B includes a vehicle 102. The two scenarios represent two different runs through the same environment (i.e., as the vehicle traverses the environment during a first and second, different, period of time), and the vehicles 102 may be the same vehicle or different vehicles. In the following, the vehicles 102 in both scenarios 100A, 100B is the same autonomous vehicles (AV). The vehicle 102 will hereinafter be referred to as the AV 102 for ease of description and to separate the vehicle 102 from another vehicle 106A-B present in the scenarios 100A-B. The AV 102 may include a vehicle computing device and may be part of a vehicle system (not shown) that includes one or more remote computing devices. The example scenarios 100A-B involve the AV 102 using a camera 112—positioned on a front side of the AV and facing a forward direction of travel. The camera has a field of view (FOV) indicated by the dashed lines 110. The camera 112 may thus capture images 120A-B of the environment in which the AV 102 travels. The environment comprises a road 104 through an environment comprising static objects 114, 116, 118 and moving objects 106A-B, 108A-B. The static objects comprise a building 114, a tree 116 and a traffic light 118. The moving objects comprises pedestrians 108A-B and vehicles 106A-B. The AV 102 may comprise further sensors, as will further be exemplified below in conjunction with FIG. 7. In FIG. 1, the positions of the camera 112 and the sensors are by way of example. The camera 112 may generally capture images in a main driving direction of the AV 102 but may be located at any suitable position on the AV 102. The other sensor(s) for sensing the environment and/or the vehicle operation status may similarly be positioned at any suitable place or places on the AV 102, as will be further described below in conjunction with FIG. 7.

Images 120A-B obtained from the camera 112 may be used, at least in part, to control the AV 102. For example, the images may be used to determine whether the AV 102 should stop at the traffic light 118 or can proceed to travel pass the traffic light 118. The analysis of images captured by the camera 112, as well as analysis of other sensor data captured by the further sensors may be performed by the vehicle computing device. However, for various reasons, images 120A-B captured by the camera 112 may need to be transmitted from the AV to e.g., be stored at external memory for various reasons, such as for further analysis, data mining, simulations to be used as training data for machine learning algorithms, or for legal purposes.

As shown in FIG. 1, the two images 120A-B, which are captured at different times but from the same location on the road 104, comprises several areas which are very similar between the images, for example areas 122A-B, 124A-B and 126A-B. Moreover, the content of some of these areas may not be very relevant for the reasons as to why the images are being stored in external memory. For example, storing image data relating to the building in the areas 122A-B or the vegetation in the areas 124A-B may just occupy space at the external memory, without any purpose other than that they are part of the images 120A-B being stored. These regions may thus be either less important for perception tasks needed for autonomous navigation, or for any other reason as to why the images 120A-B are transmitted from the AV 102 such as legal reasons, data mining, teleoperation, etc. Other static or semi static regions in the environment, such as the traffic sign 118 captured in the images 120A-B in the areas 126A-B may be considered more important for the reasons defined above.

The AV 102 capturing the images 120A-B may determine labels pertaining to areas/portions of the images 120A-B, for example using the perception component of the AV 102. These labels may for example indicate an image content type of the areas of the images. An image content type may for example comprise an object type of an object depicted in an area of the image. Example object types include pedestrian, car, bicycle, road marking, stop sign, building, tree, etc. An image content type may also include sky, vegetation, road, etc. The image content type may be determined based on image analysis, based on other sensor data such as LIDAR data, audio data, etc., and/or using map data.

The perception component may further determine motion data indicating motion detected in the part of the environment depicted in the images. For example, the vehicles 106A-B, pedestrians 108A-B and cyclists in the images 120A-B may move in different speed and directions. Such data may form part of the labels, or be transmitted separately to the component (e.g., a remote computing device) configured to store the images in external storage. The perception component will be further described below in conjunction with FIG. 7.

In some examples, the images 120A-B may further be labeled with data indicating an importance of image content of portions/areas of the images 120A-B for controlling an operation of the AV 102 as it traverses the environment. For example, the image content of the areas 126A-B may be important for controlling the operation of the AV 102. Image content represent representing the oncoming vehicles 106A-B and the pedestrian 108A-B may also be considered important for controlling the operation of the AV 102. The importance data may be provided by a planning component of the AV 102, which will be further described below in conjunction with FIG. 7.

In some examples, the images 120A-B may be labeled with data indicating content of logs relating to the period of time when the images 120A-B was captured. For example, in case error messages or similar are logged at the time of capturing the images 120A-B, the images 120A-B may be labeled to indicate this.

In some examples, the images 120A-B may be labeled with data indicating driving scenarios of the AV 102 while capturing the images 120A-B. For example, if the AV, in either of the scenarios 100A-B, requires assistance from a teleoperation service to determine if the vehicle should stop at the traffic light 118 or can proceed to travel pass the traffic light 118, this may be indicated by a label associated with the image 120A-b corresponding to that scenario.

The images 120A-B may be associated with metadata indicating contextual information about of the respective image 120A-B. The meta data may comprise geolocation data, for example determined by a localization component of the AV 102. The localization component may continuously determine a location and/or orientation of the AV 102, and such data may form part of the geolocation data being associated with the images 120A-B. The localization component will be further described below in conjunction with FIG. 7. The geolocation data may comprise GPS coordinates of the AV 102. The AV 102 may also include a yaw rate sensor, such as an inertial measurement unit (IMU), gyroscope, or other sensor for measuring a yaw rate of the vehicle 102. The geolocation data may in examples comprise the yaw rate of the vehicle. The geolocation data may further comprise the turn angle indicative of a degree of rotation of the AV. The turn angle may be based at least in part on the wheel angles of the AV, e.g., as commanded by the trajectory planner and/or measured from the steering components. For example, the wheel angle may be an angle that is provided by (or retrieved from) a vehicle-trajectory planner, steering components (e.g., steering sensor, steering motor, and/or steering rack), or any combination thereof. The geolocation data may further comprise data indicative of an angle of motion of the vehicle. The geolocation data may further comprise data relating which lane of a multi lane road that the AV is travelling on.

The metadata (contextual information) may further comprise technical metadata, e.g., configuration data with information of the camera capturing the respective image 120A-B such as sensor id, angle of view 110 of the camera 112, mounting location of the camera 112 on the AV 102, etc. The metadata may further indicate weather conditions in the environment while capturing the first sensor data, i.e., weather conditions in the respective scenario 100A-B. The metadata may further indicate time of day when capturing the respective image 120A-B, i.e., 6.15 respective 6:45 for the two image 120A-B in the example of FIG. 1. The metadata may further indicate object identifiers of objects of the environment captured in the images 120A-B, for example an identifier of the building 114 or the traffic light 118.

By providing the contextual information as exemplified above, it can be determined that the image data of one of the images 120A-B and image data of the other one of the images 120A-B are captured at coordinates in the environment differing with less than a threshold distance from each other, and that of the environment traversed by the AV during the first period of time, and captured in image 120A, and the parts of the environment traversed by the AV during the second period of time, and captured in image 120B, at least partly overlap. Consequently, as described herein, compression of one of the images 120A-B can be aided by the fact that for some environments, many of the structures and objects in the environment stays the same over time. This is exemplified in FIG. 1, for example in image areas 122A-B depicting a building, 124A-B depicting vegetation and 126A-B depicting a traffic light.

In the example of FIG. 1, it may for example be determined that the image data of the portions 124A-B depicting vegetation in the two images 120A-B differ with less than a dissimilarity threshold from each other. In examples, the right image 120B in FIG. 1 may be compressed into compressed image data at least by referring to the portion 124A of the left image 120A in the compressed image data, i.e., for the part of the compressed image data corresponding to the portion 124B in the right image 120B.

Figure 2:
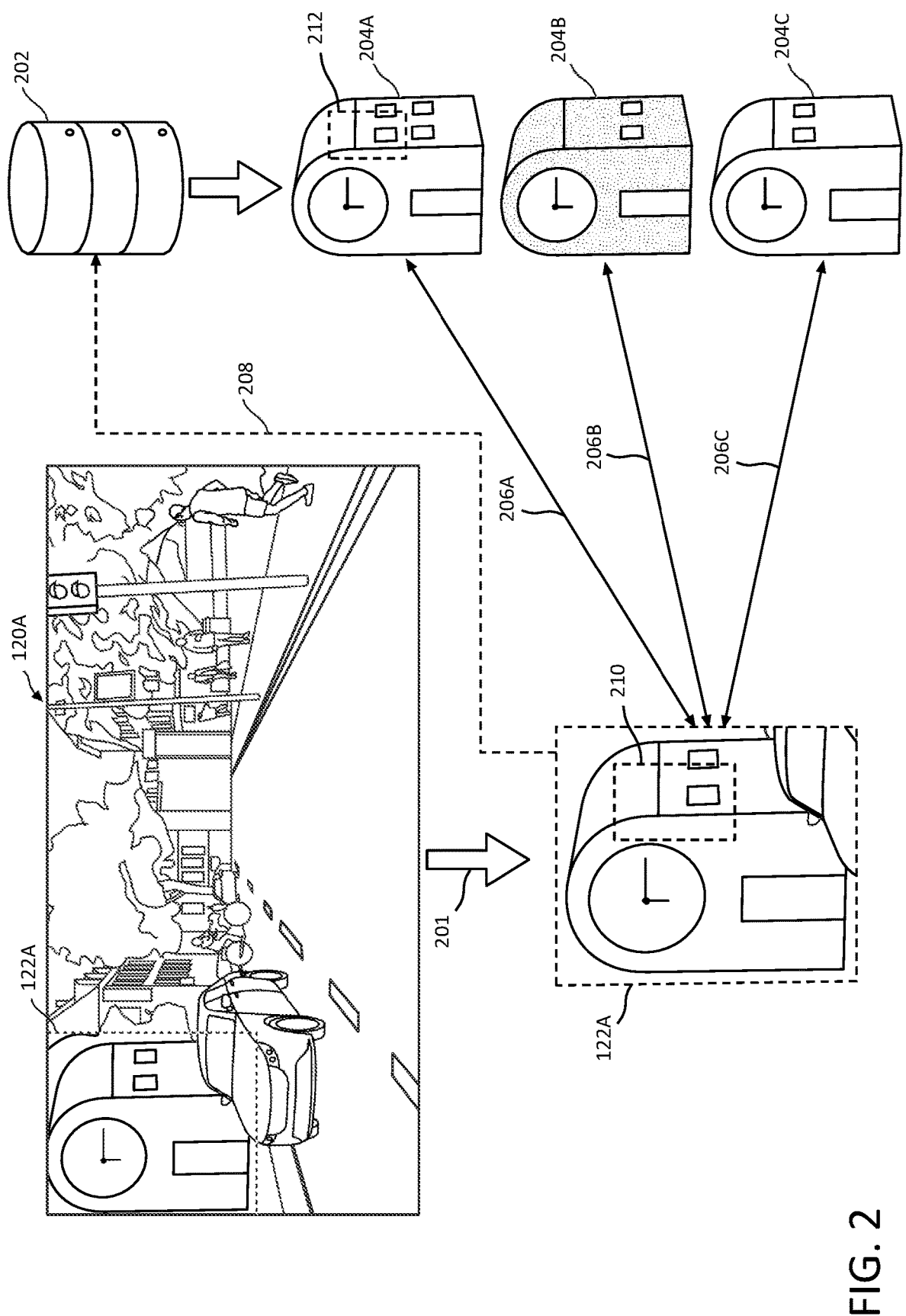
FIG. 2 shows a comparison between image data to be compressed and a plurality of stored image data captured at a same coordinate to select a most suitable reference image data to use for compression.

FIG. 2 shows by way of example compression of the image 120A captured by an AV 102 traversing the environment shown in FIG. 1. A device external to the AV 102, for example an external computing device 636 described in conjunction with FIG. 7 below, may receive 201, from a camera of the AV traversing an environment during a first period of time, first image data 122A. The first image data 122A may be associated with first metadata indicating contextual information about the first sensor data, the first metadata comprising first geolocation data indicating coordinates in the environment where the first image data 122A was captured. The image data 122A is in this case depicting the static building 114 from FIG. 1. In examples, the first metadata comprises an object identifier of the building 114.

In some examples, the external computing device may receive from the camera of the AV traversing the environment during the first period of time, the entire first image 120A. The first image may be associated with the first geolocation data indicating coordinates in the environment where the first image was captured. In this case, the external computing device may apply an image segmentation algorithm to the first image to detect a set of features and determine the first image data based at least in part on the detected set of features. In some examples, the segmentation is performed at the AV 102.

There are several techniques that can be used to segment data, and the most appropriate method will depend on the characteristics of the data and the specific goals of the segmentation process. Some techniques (exemplified below for an image, but can be used for other types of data) include:

Thresholding: This involves dividing the image into segments based on the intensity or color of the pixels. For example, thresholding may be used to separate the foreground and background elements in an image, or to identify the outline of an object in an image.

Region-based segmentation: This technique involves dividing the image into segments based on the spatial characteristics of the pixels. For example, region-based segmentation may be used to divide an image into segments based on the shape or size of the objects in the image.

Clustering: This technique involves grouping pixels into segments based on similarity measures, such as color or intensity. Clustering can be used to identify distinct objects or features in an image.

Edge detection: This involves identifying the boundaries or edges between different objects or regions in an image. Edge detection can be used to segment an image by tracing the outlines of objects in the image.

Machine learning: Machine learning algorithms, such as convolutional neural networks (CNNs), may be used to segment images. These algorithms can be trained on a dataset of labelled images to learn to identify and segment specific objects or features in new images.

Segmentation based on texture, wherein the texture is characterized by computing feature vectors. Example of feature vectors are based on statistical features or features computed using signal processing transforms (e.g., Fourier transform).

The segmented image data may in examples be classified, for example using the features detected during the segmentation process. In other examples, as discussed above, the image 120A and/or image data 122A is associated with labels or other metadata (such as motion data) which can guide the compression algorithms described herein.

Typically, the external device, and/or the vehicle transmitting the image data to the external device, may be configured to determine image data 122A from the image 120A which may benefit most from the compression techniques described herein. For example, classification algorithms may determine which parts of the image 120A that are static. This may be accomplished by comparing several subsequent images from a video stream of images to determine which objects that does not move. In some examples, map data may be used to determine which parts of an image 120A that corresponds with objects on the map (which typically are static). Moreover, as discussed above, image data depicting objects that are not important for controlling the AV may be advantageous to compress using the techniques described herein, since such compression may be lossy to a larger extent. In some examples, image data from the image 120A that may be advantageous to replace to produce artificial data for simulation purposes may be determined, for example replacing an adult pedestrian with a child playing with a ball to train for such situations.

When the image data 122A has been determined, similar image data 204A-C already stored in storage 202 is determined. These stored image data 204A-C may be determined by comparing their respective associated contextual information (metadata), for example comprising geolocation data with the contextual information associated with the received 201 image data 122A. The image data 204A-C from the storage 202 may be captured at coordinates in the environment differing with less than a threshold distance from the coordinates indicated by the geolocation data associated with the received 201 image data 122A.

In some examples, as exemplified in FIG. 2, the storage 202 comprises a plurality of image data 204A-C with matching geolocation data. The image data 204A-C may however be captured at different weather conditions or at different time of day which may influence the lighting conditions of the stored images 204A-C or resulting in that some of the windows in the building is covered by blinds. In some examples, as described above, the full contextual information associated with the first image data 122A may be compared with the full contextual information of each of the stored image data 204A-C to determine the most suitable stored image data to be used to aid compression. Additionally, or alternatively, the most suitable image data may be determined using any data comparison techniques, such as a pixel-by-pixel comparison, histogram matching, etc. If such matching 206A-C results in that the most similar image data from the storage 202 differs with less than, or equal to, a matching dissimilarity threshold from the received 201 image data 122A, the best matching stored image data may be used to aid compression of the received 201 image data 122A. The matching dissimilarity threshold used in this case may vary based on for example the object type of an object depicted in the image data 122A, importance data indicating an importance of image content of the image data 122A for controlling an operation of the AV traversing the environment during the first period of time, motion data indicating motion detected in the part of the environment depicted in the image data 122A, usability data indicating an intended use of the storing the image data 122A, etc. as described above.

In some examples, in case no stored image is found matching the received 201 image data 122A to a large enough extent (e.g., difference exceeds the matching dissimilarity threshold), at least parts of the image data 122A may be stored 208 in the storage 202.

In the example of FIG. 2, the stored image data 204A is selected to aid compression of the received 201 image data 122A. In some examples, the entire stored image data 204A is used to aid compression of the entire received 201 image data 122A. In some examples, a portion 212 of the stored image data 204A is used to aid compression of a portion 210 of the received 201 image data 122A. Based at least in part of the comparison 206A between the image data 122A and the stored image data 204A, at least for a portion 210 of the image data 122A, a corresponding portion 212 of the stored image data 204 differing with less than an image dissimilarity threshold from the portion 210 of the image data 122A is determined.

Figure 3:
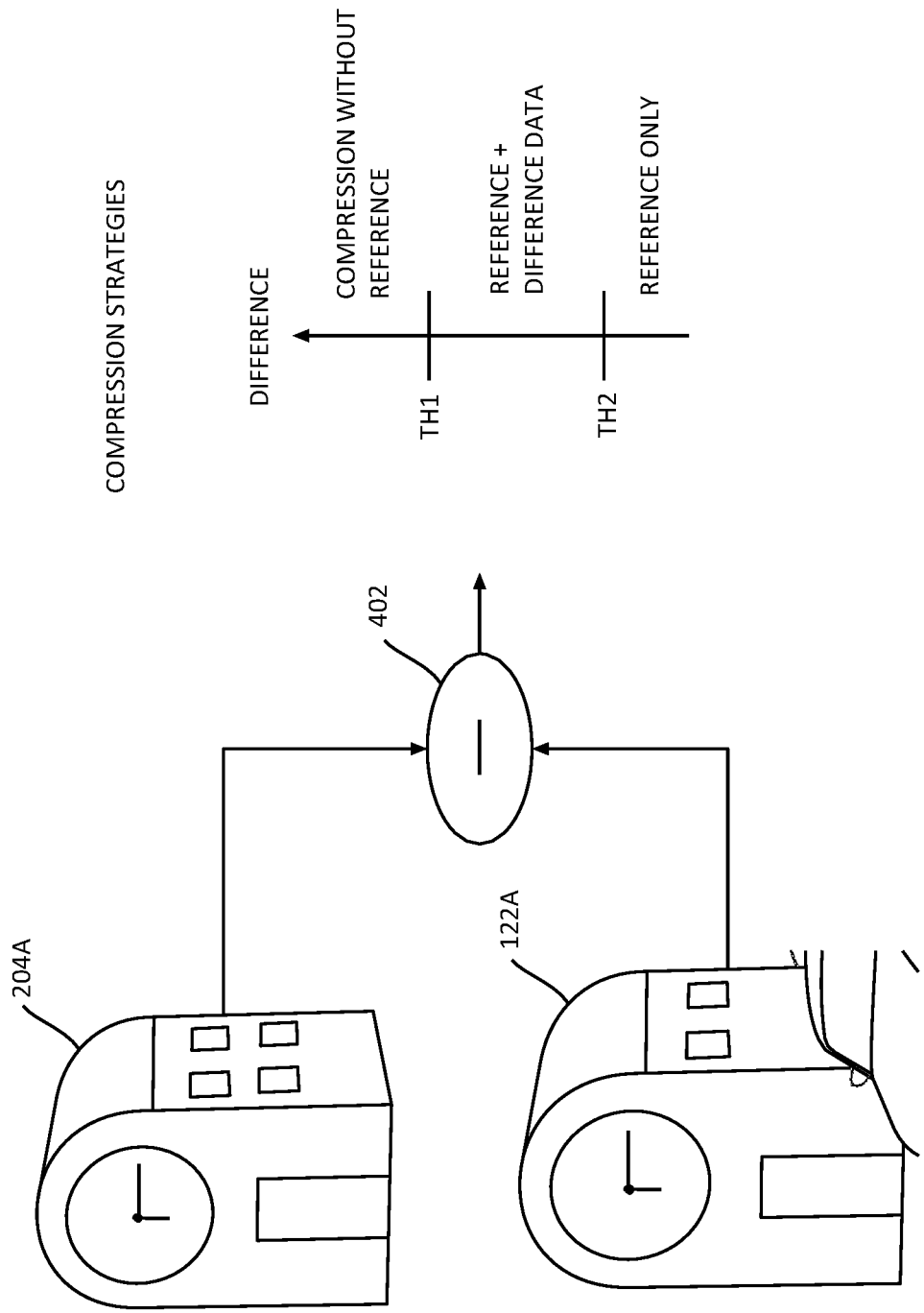
FIG. 3 shows an example of determining a compression strategy to be used on first image data based on a comparison between the first image data and second image data.

FIG. 3 shows by way of example how different compression strategies may be selected based on a determined difference between the (first) image data 122A to compress and the (second) image data 204 retrieved from storage 202.

In FIG. 3, the entire second image data 204A is used to aid compression of the entire first image data 122A. In other examples, only portions of the respective image data 204A, 122A is used as discussed above.

The first image data 122A is compared 402 with the second image data 204A. In some examples, in case the first image data 122A differs with less than a first image dissimilarity threshold TH1 from the second image data 204A, the first image data may be compressed into compressed image data at least by referring to the second image data 204 in the compressed image data. In some examples, a difference data set may be determined between the first image data 122A and the second image data 204A (e.g., residual data), and the difference data set may be compressed and included in the compressed version of the first data image 122A. In other examples, only direct referral is used such that any difference between the first image data 122A and the second image data 204A is neglected.

In some examples, the inclusion of the difference data set is determined based on the two image dissimilarity thresholds TH1, TH2. For example, upon the first image data 122A and the second image data 204A differing more than a second image dissimilarity threshold TH2 (the second image dissimilarity threshold TH2 being lower compared to the first image dissimilarity threshold TH1), the difference data set is compressed and including in the compressed version of the first image data 122A. In case the difference is lower than the second image dissimilarity threshold TH2, any difference between the first image data 122A and the second image data 204A is neglected in the compressed version of the first image data 122A. This means the if the first image data 122A and the second image data 204 is similar enough (according to TH2), a reference between the second image data is included in the compressed version of the first image data 122A without the difference data set. In case the difference exceeds the first image dissimilarity threshold TH1, compression of the first image data 122A is done using without referring to the second image data at all.

In some examples, the difference data set is always included in the compressed version of the first image data 122A, and the second image dissimilarity threshold TH2 is not used. In some examples, the difference data set is never included in the compressed version of the first image data 122A, e.g., the first image dissimilarity threshold TH1 is not used.

Figure 4:
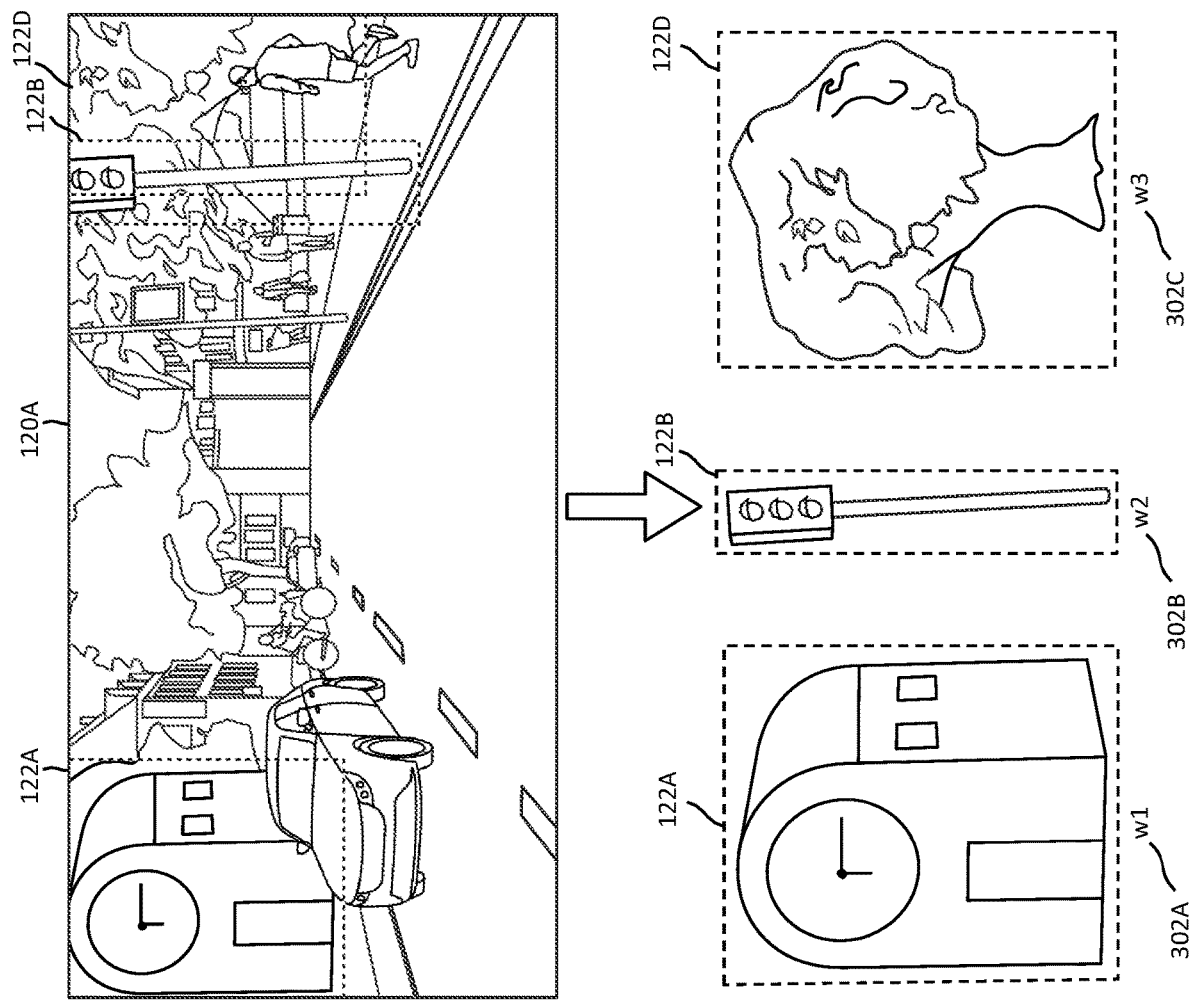
FIG. 4 shows extraction of portions of image data from an image and a corresponding dissimilarity threshold applicable to each portion of image data.

As discussed above, either one or both of the image dissimilarity threshold(s) TH1, TH2 may vary over a plurality of image data (e.g., over a plurality of image frames, and/or over a plurality of portions of a same image frame), due to several reasons. FIG. 4 shows by way of example how the thresholds may vary based on a determined importance 302A-C of decompression quality of objects in different regions 122A-C of an image frame 120A.

Compression is the process of reducing the size of a file by encoding data in a way that can be reconstructed accurately when the file is uncompressed. Compression techniques can be broadly divided into two categories: lossless and lossy compression. Lossless compression is a compression method where the original data can be reconstructed perfectly from the compressed data. In other words, when a file is compressed using a lossless compression algorithm and then uncompressed, the resulting file is identical to the original file. Lossy compression, on the other hand, is a compression method where some data is lost during compression and cannot be reconstructed perfectly when the file is uncompressed. In other words, when a file is compressed using a lossy compression algorithm and then uncompressed, the resulting file is not identical to the original file. For lossy compression, the decompression quality may be measured by comparing the decompressed file with the original file using specific quality metrics. For example, in image compression, used quality metrics includes Peak Signal-to-Noise Ratio (PSNR), Structural Similarity Index (SSIM), and Mean Squared Error (MSE). Such metrics may measure the amount of distortion introduced by the compression algorithm and provide a numerical value that represents the level of image quality.

In FIG. 4, three objects are extracted from an image 120A. Each object is depicted in a respective region 122A-C of the image 120A. The first object is a building. The second object is a traffic light. The third object is a tree.

The building may be considered a static object with little importance when it comes to controlling the AV. As such, a determined importance 302A of decompression quality of the building may be set to a comparably lower value w1.

The traffic light may be considered as a semi-static object (the active signal varies). Moreover, the traffic light may be important for controlling the AV. Consequently, it may be important to correctly determine at least the active signal from the compressed version of the image 120A, for example for legal purposes or later analysis. As such, a determined importance 302B of decompression quality of the traffic light may be set to a comparably higher value w2.

The tree may be considered as a semi-static object (wind or seasons affect the foliage of the tree). However, the tree may not be important for controlling the AV. Moreover, the semi-static properties of the foliage of the tree may be considered as occupying unnecessary space when storing even a lossy version of the tree. Consequently, a determined importance 302C of decompression quality of the tree may be set to an even lower value w3 (w3<w1<w2).

The determined importance 302A-C may thus influence the image dissimilarity threshold(s) as described in conjunction with FIG. 3.

Figure 5:
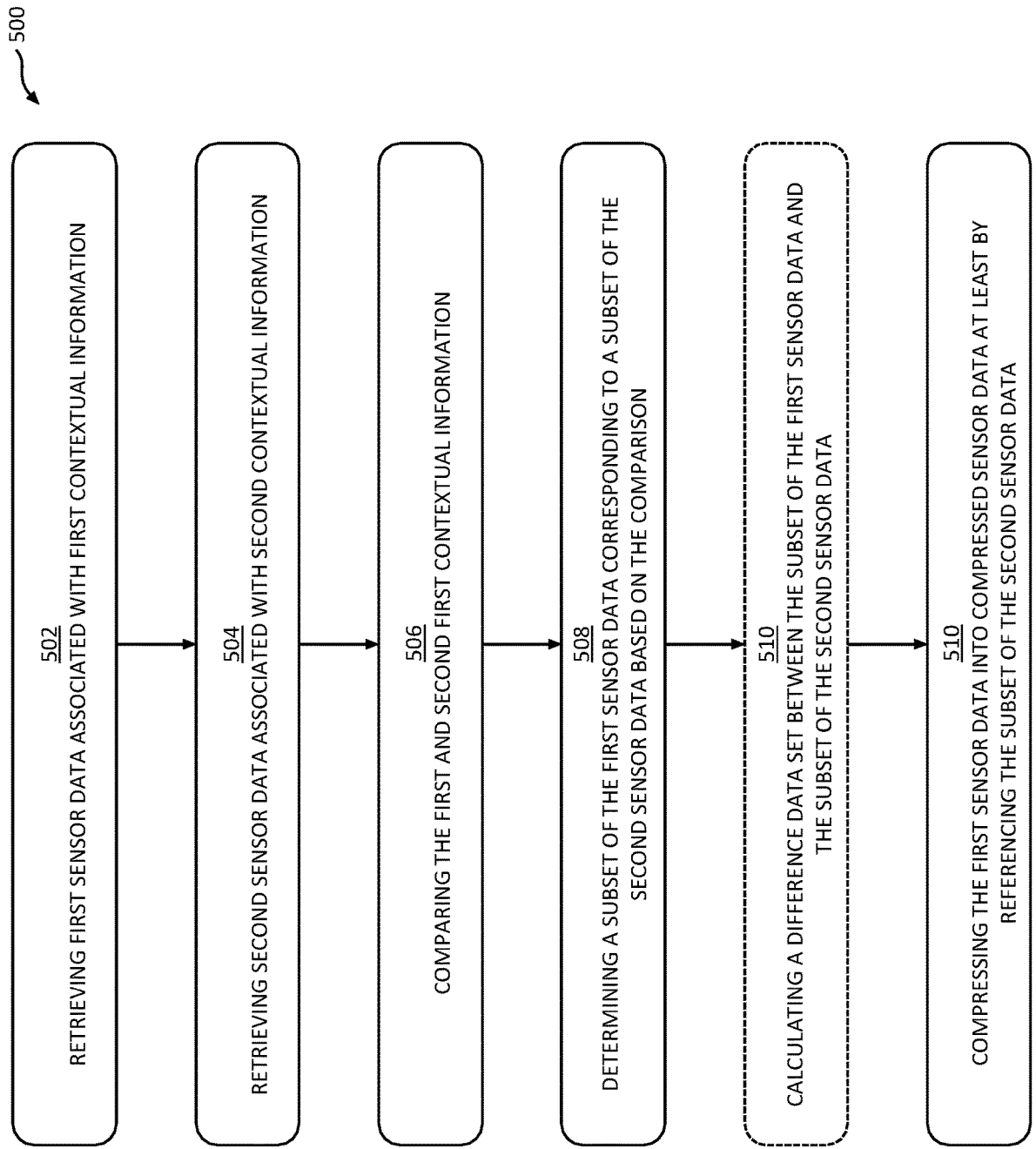
FIG. 5 shows a flow chart of a method for compression of sensor data.

FIG. 5 shows a flow chart of a method 500 for compression of sensor data as discussed herein. The method 500 comprises retrieving 502 first sensor data captured during a first period of time, the first sensor data being associated with first metadata indicating contextual information about the first sensor data. The first metadata comprises first geolocation data indicating coordinates in an environment where the first sensor data was captured. In examples, the first metadata further comprises at least one of: weather conditions in the environment while capturing the first sensor data; a time of day when the first sensor data was captured; object identifiers of objects of the environment captured in the first sensor data; or configuration data relating to a sensor capturing the first sensor data.

The method 500 further comprises retrieving 504 second sensor data captured during a second period of time, the second period of time being different from the first period in time, the second sensor data being associated with second metadata indicating contextual information about the second sensor data. The second meta data comprises second geolocation data indicating coordinates in the environment where the second sensor data was captured. In examples, the second metadata further comprises at least one of: weather conditions in the environment while capturing the second sensor data; a time of day when the second sensor data was captured; object identifiers of objects of the environment captured in the second sensor data; or configuration data relating to a sensor capturing the second sensor data.

The method 500 further comprises comparing 506 the first and second metadata.

The method 500 further comprises determining 508 a subset of the second sensor data corresponding to a subset of the first sensor data based at least in part of the comparison between the first and second metadata.

In some examples, the method 500 comprises determining 510 a difference data set between the subset of the first sensor data and the subset of the second sensor data.

The method 500 further comprises compressing 510 the first sensor data into compressed sensor data at least by referencing the subset of the second sensor data in the compressed sensor data. In some examples, the method 500 comprises compressing the difference data set and including the compressed difference data set in the compressed sensor data. The method 500 may further comprise storing the compressed sensor data.

Figure 6:
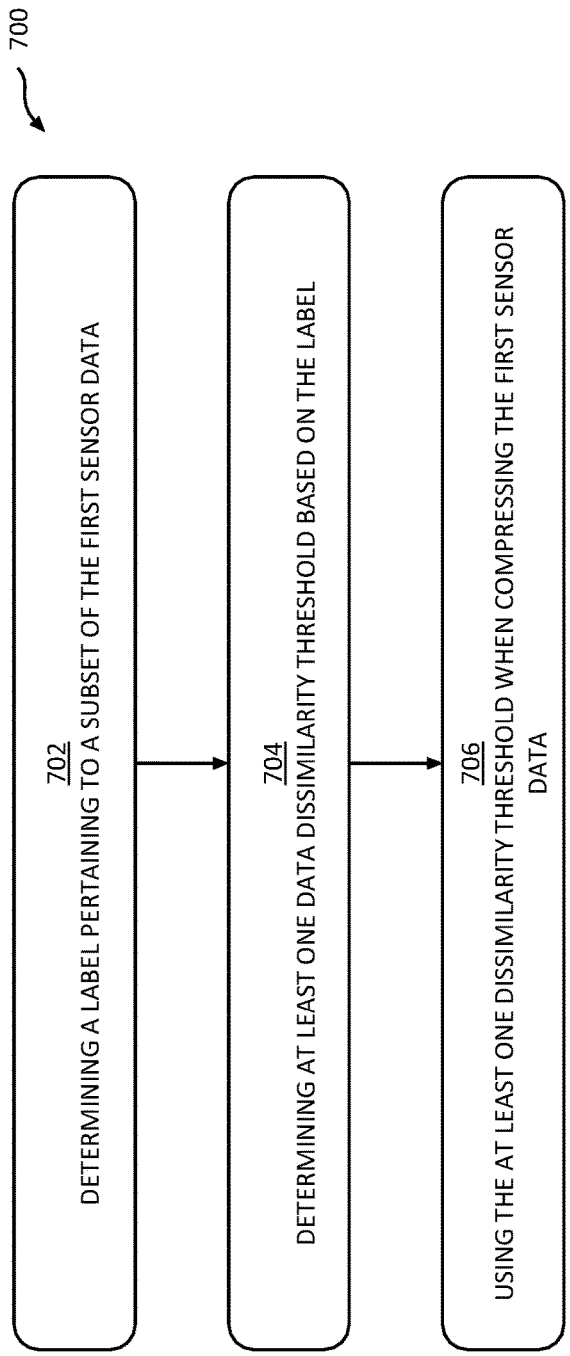
FIG. 6 shows a flow chart of a method for determining at least one dissimilarity threshold to be used when compressing sensor data.

FIG. 6 shows a flow chart of a method 700 for determining at least on dissimilarity threshold to be used when compressing sensor data. The method 700 comprises determining 702 at least one label pertaining to a subset of the first sensor data. Each label of the at least one label indicates at least one of: a data content type of the subset of the first sensor data, motion data indicating motion detected in the part of the environment represented by the subset of the first sensor data, importance data indicating an importance of data content of the subset of the first sensor data for controlling an operation of an autonomous vehicle traversing the environment during the first period of time, and usability data indicating an intended use for the subset of the first sensor data.

The method 700 further comprises determining 704 at least one data dissimilarity threshold (e.g., as discussed above in conjunction with FIG. 3) for the subset of the first sensor data based at least in part on the at least one label. The at least one data dissimilarity threshold is then used 706 when compressing the first sensor data.

Additional Example Vehicle System

Figure 7:
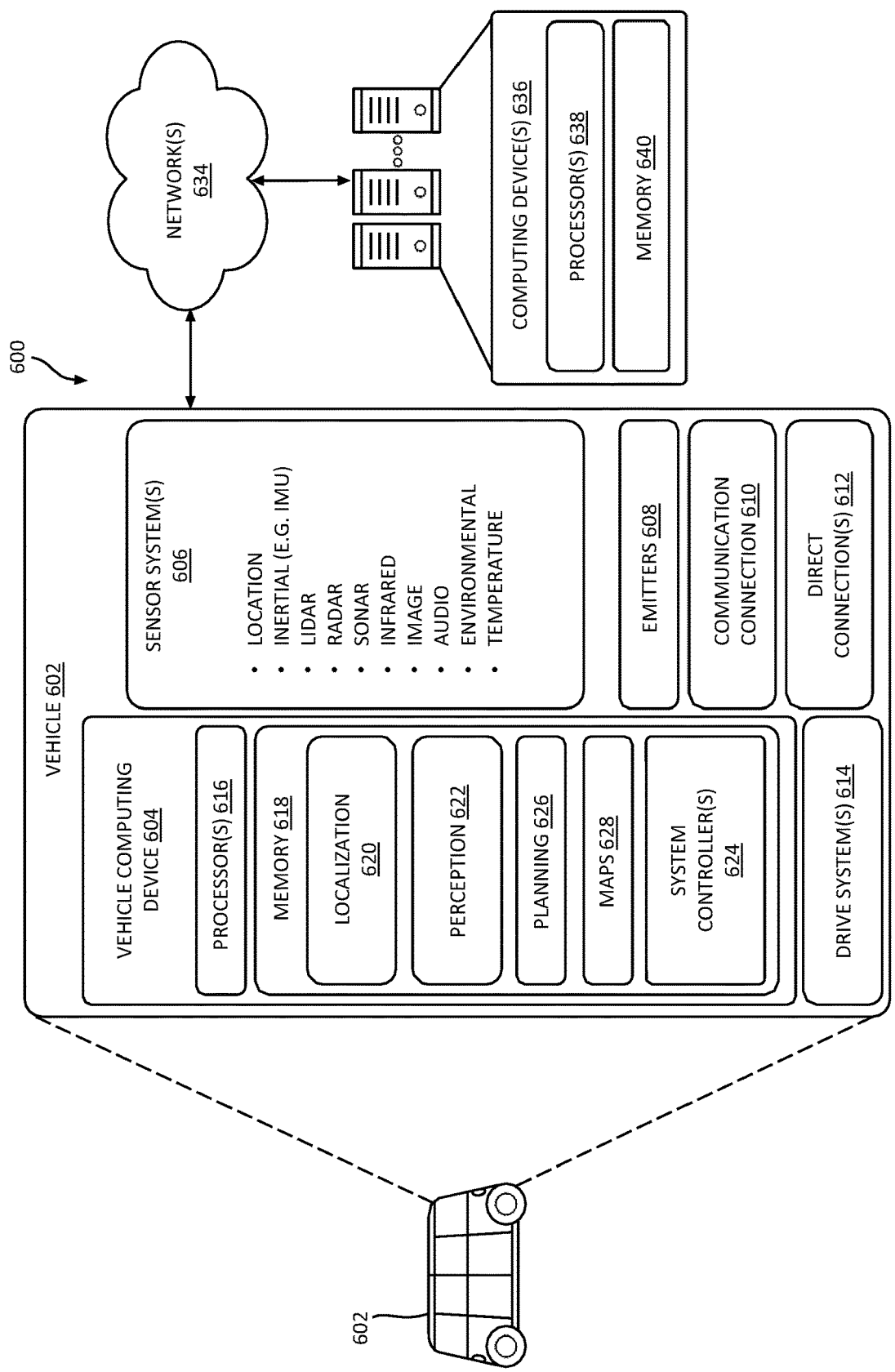
FIG. 7 depicts a block diagram of an example vehicle system.

A further example of a vehicle system 600 is depicted in FIG. 7. The vehicle system 600 includes a vehicle 602, which may be the vehicles 102 in FIG. 1. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification. Moreover, in some instances, the techniques described herein may be usable in conjunction with non-autonomous vehicles as well.

The vehicle 602 may include vehicle computing device(s) 604, one or more sensor systems 606, one or more communication connections 610, at least one direct connection 612 (e.g., for physically coupling the vehicle 602 to exchange data and/or to provide power), and one or more drive systems 614.

In some instances, the sensor(s) 606 (referred to as 106, 108*a-c*) may include light detection and ranging (LIDAR) sensors, RADAR sensors, ultrasonic transducers, sonar sensors, location sensors (e.g., global positioning system (GPS), compass, etc., used at least in part to determine the geolocation data discussed above), inertial sensors (e.g., inertial measurement units (IMUs), accelerometers, magnetometers, gyroscopes, etc.), one or more cameras (such as camera 112 in FIG. 1, e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 606 may include multiple instances of each of these or other types of sensors. For instance, the LIDAR sensors may include individual LIDAR sensors located at the corners, front, back, sides, and/or top of the vehicle 602. As another example, the cameras may include multiple cameras disposed at various locations about the exterior and/or interior of the vehicle 602. The cameras may in some instances have overlapping FOVs. The sensor(s) 606 may provide input to the vehicle computing device(s) 604 such as relating to a yaw rate of a vehicle, a linear velocity of the vehicle, a lateral velocity of the vehicle, and commanded wheel angles of the wheels.

The vehicle computing device(s) 604 may include one or more processors 616 and memory 618 communicatively coupled with the one or more processors 616. In the illustrated example, the memory 618 of the vehicle computing device(s) 604 stores a localization component 620, a perception component 622, a planning component 626, one or more maps 628, one or more system controllers 624, and a safety system 630. Though depicted in FIG. 7 as residing in memory 620 for illustrative purposes, it is contemplated that the localization component 620, perception component 622, planning component 626, safety system 630 and/or the one or more maps 628 may be accessible to the vehicle 602 (e.g., stored on, or otherwise accessible by, memory remote from the vehicle 602), for example to retrieve labels pertaining to captured sensor data as discussed herein.

An example of such remote memory is the computing device 636. The computing device 636 may include one or more processors 638 and memory 640. Although not depicted here, in some instances the computing device 636 may store the above-referenced components and controllers. The processor 616 may access these as required from the computing device 636 via the network 614 that connects the vehicle 602 and the computing device 636. The remote memory may be used to store compressed sensor data as discussed herein, as well as a library of sensor data usable to aid compression of newly captured sensor data as also discussed herein.

In some examples, the vehicle 602 may send operational data, including raw or processed sensor data from the sensor system(s) 606, to one or more computing device(s) 616 via the network(s) 614.

In some instances, the perception component 622 may include functionality to perform object detection, segmentation, and/or classification. For example, the perception component may determine labels associated to sensor data captured by a sensor of the AV, such as an image captured by a camera of the AV. In some instances, the labels are associated with a position in the sensor data. Labels may include e.g., pedestrian, vehicle, bicycle, animal, building, trees, traffic sign, road, grass, sky, road markings, etc. In some examples, the perception component 622 may provide processed sensor data that indicates a presence of an entity that is proximate to the vehicle 602 and/or a classification of the entity as an entity type (e.g., car, pedestrian, cyclist, animal, traffic light, building, tree, road surface, curb, sidewalk, unknown, etc.). In additional or alternative examples, the perception component 622 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc. In some examples, at least some of the functionality of the perception component 622 may be implemented at the remote computing device(s) 636.

The sensors of the vehicle 602 may provide the data relating to the objects in the environment as inputs to a perception component of the vehicle computing device, such as perception component 622. The perception component may use the data to perform object detection, segmentation, classification, and other data processing to determine characteristics about the objects.

The perception component 622 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation or may be objects identified within video data. Simulation data may be received from a planning component such as planning component 626 or localization component such as localization component 620, or from a remote device, such as remote computing device 636. In some examples, the data may comprise map data received from the maps 628 or the other components in memory.

The data gathered (such as for example the first and second image data as discussed above, e.g., in conjunction with FIG. 1) may be communicated from a starting, first component, e.g., the processors of the vehicle, to a target, second component, such as a different device, different hardware, or different software. The term component is here used to refer to devices, hardware, software, or other features of a computing system to which data may be transferred and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device or may be in remote computing devices. For example, referring to FIG. 7, the data may be transferred from the perception component 622 to other software components stored in the memory 618 of the vehicle, such as the localization component 620 or planning component 626. In some instances, the data may be transferred from the perception component 622 to the remote computing device 636 via the communication connection 610 and network 634.

The localization component 620 may be configured to receive data from the sensor system(s) 606 to determine a position and/or orientation of the vehicle 602, e.g., one or more of an x-, y-, z-position, roll, pitch, or yaw. For example, the localization component 620 may include and/or request/receive a map 628 of an environment and may continuously determine a location and/or orientation of the autonomous vehicle within the map 628. For example, the localization component 620 may determine the lateral velocity of the vehicle 602.

In at least one example, the planning component 626 may determine a location of a user based on image data of an environment received from the user using, for example, bags of binary words with image-based features, artificial neural network, and the like. Further, the planning component 626 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In at least one example, the planning component 626 may determine a pickup location based at least in part on determining a user identity (e.g., determined via image recognition or received as an indication from a user device, as discussed herein).

A communication connection 610 may enable communication between the vehicle 602 and one or more other local or remote computing device(s). For instance, the communication connection(s) 610 (such as for example communication channel 201 of FIG. 2) may facilitate communication with other local computing device(s) on the vehicle 602 and/or the drive system(s) 614. Also, the communication connection(s) 608 may additionally or alternatively allow the vehicle 602 to communicate with other nearby computing device(s) (e.g., other nearby vehicles, traffic signals, etc.). The communication connection(s) 610 may additionally or alternatively enable the vehicle 602 to communicate with a computing device 636. The computing device 636 may be at a remote location from the vehicle and the vehicle may communication with the computing device 636 over a network 614.

It will be appreciated that sensor data and associated geolocation data/label data is used as examples in FIGS. 1-6, but that any data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 602, map data may be transferred from the one or more maps 628 of the vehicle memory 618 to the localization or planning components 620, 626. In some examples, data may be transferred from the planning component 626 to the system controller 624 and/or one or more emitters 608. In some examples, data may be transferred from the system controller 624 to one or more drive systems 614.

The maps 628 may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 628 may be stored based on, for example, a characteristic (e.g., type of entity, time of day, day of week, season of the year, etc.). Storing multiple maps 628 may have similar memory requirements but increase the speed at which data in a map may be accessed. In examples, the maps 628 may further indicate the known locations of traffic lights and may be used by the perception 622 to identify known traffic lights in measurements captured by the sensor system(s) 606.

The system controller 624 may be configured to control steering, propulsion, braking, safety, emitters, communication, and other systems of the vehicle 602. The system controller(s) 624 may communicate with and/or control corresponding systems of the drive system(s) 614 and/or other components of the vehicle 602. The system controller(s) 624 may be communicatively coupled to one or more sensors of the vehicle sensor system(s) 606.

Emitter(s) 608 may be provided for emitting light and/or sound and may include interior emitters to communicate with passengers of the vehicle 602 and/or exterior emitter(s) to communicate with pedestrians or other nearby vehicles.

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 620, 640 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

EXAMPLE CLAUSES

A: A system comprising: one or more processors; and one or more non-transitory computer-readable media storing computer executable instructions that, when executed by the one or more processors, cause the system to perform actions comprising: receiving, from a camera of a vehicle traversing an environment during a first period of time, first image data, the first image data being associated with first geolocation data indicating coordinates in the environment where the first image data was captured; determining, from a storage comprising a plurality of stored image data and based at least in part on the first geolocation data, second image data captured by a vehicle traversing the environment during a second period of time, the second period of time being previous to the first period of time, wherein the second image data being captured at coordinates in the environment differing with less than a threshold distance from the coordinates indicated by the first geolocation data; comparing the first image data with the second image data; based at least in part on the comparison, for a portion of the first image data, determining a portion of the second image data differing with less than an image dissimilarity threshold from the portion of the first image data; compressing the first image data into compressed image data at least by referring to the determined portion of the second image data in the compressed image data; and storing the compressed image data.

B. The system of clause A, wherein the instructions further cause the system to perform actions comprising: varying the image dissimilarity threshold over a plurality of image data.

C. The system of any one of clause A-B, wherein the instructions further cause the system to perform actions comprising: determining a label pertaining to a portion of the first image data; determining the image dissimilarity threshold for the portion of the first image data based at least on the label, wherein the label indicates at least one of: an image content type of the portion of the first image data; motion data indicating motion detected in the part of the environment depicted in the portion of the first image data; importance data indicating an importance of image content of the portion of the first image data for controlling an operation of the vehicle traversing the environment during the first period of time; content of logs of the vehicle relating to the first period of time, driving scenarios of the vehicle during the first period of time, or usability data indicating an intended use for the portion of the first image data.

D. The system of any one of clause A-C, wherein the instructions further cause the system to perform actions comprising: receiving, from the camera of the vehicle traversing the environment during the first period of time, a first image, the first image being associated with the first geolocation data indicating coordinates in the environment where the first image was captured; applying an image segmentation algorithm to the first image to detect a set of features; and determining the first image data based at least in part on the detected set of features.

E. The system of any one of clause A-D, wherein the instructions further cause the system to perform actions comprising: determining that the first image data differs with at least a third image dissimilarity threshold from any stored image data being captured at coordinates in the environment differing with less than a threshold distance from the coordinates indicated by the first geolocation data, and storing at least parts of the first image data in the storage.

F. A computer-implemented method comprising: retrieving first sensor data captured during a first period of time, the first sensor data being associated with first metadata indicating contextual information about the first sensor data, the first metadata comprising first geolocation data indicating coordinates in an environment where the first sensor data was captured; retrieving second sensor data captured during a second period of time, the second period of time being different from the first period in time, the second sensor data being associated with second metadata indicating contextual information about the second sensor data, the second metadata comprising second geolocation data indicating coordinates in the environment where the second sensor data was captured; comparing the first and second metadata data; determining at least a subset of the second sensor data corresponding to at least a subset of the first sensor data based at least in part of the comparison between the first and second metadata data; compressing the first sensor data into compressed sensor data at least by referencing the subset of the second sensor data in the compressed sensor data; and storing the compressed sensor data.

G. The computer-implemented method of clause F, wherein the first metadata indicates at least one of: weather conditions in the environment while capturing the first sensor data; a time of day when the first sensor data was captured; object identifiers of objects of the environment captured in the first sensor data; or configuration data relating to a sensor capturing the first sensor data; and wherein the second metadata indicates at least one of: weather conditions in the environment while capturing the second sensor data; a time of day when the second sensor data was captured; object identifiers of objects of the environment captured in the second sensor data; or configuration data relating to a sensor capturing the second sensor data.

H. The computer-implemented method of any one of clauses F-G, further comprising: comparing differences between subsets of the first sensor data and subsets of the second sensor data to a first data dissimilarity threshold; and determining the subset of the second sensor data corresponding to the subset of the first sensor data based at least in part on identifying that the subset of the first sensor data and the subset of the second sensor data differs with less than the data dissimilarity threshold.

I. The computer-implemented method of clause H, further comprising: determining a varying first data dissimilarity threshold over a plurality of sensor data.

J. The computer-implemented method of clause I, further comprising: determining a label pertaining to a subset of the first sensor data; determining the first data dissimilarity threshold for the subset of the first sensor data based at least on the label, wherein the label indicates at least one of: a data content type of the subset of the first sensor data; motion data indicating motion detected in the part of the environment represented by the subset of the first sensor data; importance data indicating an importance of data content of the subset of the first sensor data for controlling an operation of an autonomous vehicle traversing the environment during the first period of time; content of logs relating to the first period of time, the logs being associated with a sensor capturing the subset of the first sensor data, driving scenarios of an autonomous vehicle traversing the environment during the first period of time, the autonomous vehicle associated with a sensor capturing the subset of the first sensor data; or usability data indicating an intended use for the subset of the first sensor data.

K. The computer-implemented method any one of clauses G-K, further comprising: determining a difference data set between the subset of the first sensor data and the subset of the second sensor data, compressing the difference data set and including the compressed difference data set in the compressed sensor data.

L. The computer-implemented method of clause K, further comprising: only upon the subset of the first sensor data and the subset of the second sensor data differs with more than a second data dissimilarity threshold, the second data dissimilarity threshold being lower compared to the first data dissimilarity threshold, compressing the difference data set and including the compressed difference data set in the compressed sensor data.

M. The computer-implemented method any one of clauses G-L, further comprising retrieving the second sensor data from a storage comprising a plurality of stored sensor data, each associated with a geolocation data indicating coordinates in the environment where the stored sensor data was captured, by: from the plurality of stored sensor data, determining one or more stored sensor data geographically corresponding to the first sensor data by comparing the associated geolocation data of a stored sensor data with the first geolocation data and determining that the stored sensor data being captured at coordinates in the environment differing with less than a threshold distance from the coordinates indicated by the first geolocation data; from the one or more stored sensor data geographically corresponding to the first sensor data, selecting the stored sensor data being most similar to the first sensor data among the plurality of stored sensor data; and based at least in part on determining that the most similar stored sensor data differs with less than a third data dissimilarity threshold from the first sensor data, retrieving the stored sensor data as the second sensor data.

N. The computer-implemented method any one of clauses G-M, based at least in part on determining that the most similar stored sensor data differs with at least the third data dissimilarity threshold from the first sensor data, storing at least part of the first sensor data in the storage.

O. One or more non-transitory computer-readable media storing instructions executable by one or more processors, wherein the instructions, when executed, cause the one or more processors to perform operations comprising: retrieving first sensor data captured during a first period of time, the first sensor data being associated with first metadata indicating contextual information about the first sensor data, the first metadata comprising first geolocation data indicating coordinates in an environment where the first sensor data was captured; retrieving second sensor data captured during a second period of time, the second period of time being different from the first period in time, the second sensor data being associated with second metadata indicating contextual information about the second sensor data, the second metadata comprising second geolocation data indicating coordinates in the environment where the second sensor data was captured; comparing the first and second metadata data; determining at least a subset of the second sensor data corresponding to at least a subset of the first sensor data based at least in part of the comparison between the first and second metadata data; compressing the first sensor data into compressed sensor data at least by referencing the subset of the second sensor data in the compressed sensor data; and storing the compressed sensor data.

P. The one or more non-transitory computer-readable media of clause O, wherein the first metadata indicates at least one of: weather conditions in the environment while capturing the first sensor data; a time of day when the first sensor data was captured; object identifiers of objects of the environment captured in the first sensor data; or configuration data relating to a sensor capturing the first sensor data; and wherein the second metadata indicates at least one of: weather conditions in the environment while capturing the second sensor data; a time of day when the second sensor data was captured; object identifiers of objects of the environment captured in the second sensor data; or configuration data relating to a sensor capturing the second sensor data.

Q. The one or more non-transitory computer-readable media any one of clauses O-P, wherein the operations further comprise: comparing differences between subsets of the first sensor data and subsets of the second sensor data to a first data dissimilarity threshold; and determining the subset of the second sensor data corresponding to the subset of the first sensor data based at least in part on identifying that the subset of the first sensor data and the subset of the second sensor data differs with less than the data dissimilarity threshold.

R. The one or more non-transitory computer-readable media clause Q, wherein the operations further comprise: determining a varying first data dissimilarity threshold over a plurality of sensor data.

S. The one or more non-transitory computer-readable media of clause R, wherein the operations further comprise: determining a label pertaining to a subset of the first sensor data; determining the first data dissimilarity threshold for the subset of the first sensor data based at least on the label, wherein the label indicates at least one of: a data content type of the subset of the first sensor data; motion data indicating motion detected in the part of the environment represented by the subset of the first sensor data; importance data indicating an importance of data content of the subset of the first sensor data for controlling an operation of an autonomous vehicle traversing the environment during the first period of time; content of logs relating to the first period of time, the logs being associated with a sensor capturing the subset of the first sensor data; driving scenarios of an autonomous vehicle traversing the environment during the first period of time, the autonomous vehicle associated with a sensor capturing the subset of the first sensor data; or usability data indicating an intended use for the subset of the first sensor data.

T. The one or more non-transitory computer-readable media clause Q, wherein the operations further comprise: determining a difference data set between the subset of the first sensor data and the subset of the second sensor data; and compressing the difference data set and including the compressed difference data set in the compressed sensor data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer executable instructions that, when executed by the one or more processors, cause the system to perform actions comprising:
receiving, from a camera of a vehicle traversing an environment during a first period of time, first image data, the first image data being associated with first geolocation data indicating coordinates in the environment where the first image data was captured;
determining, from a storage comprising a plurality of stored image data and based at least in part on the first geolocation data, second image data captured by a vehicle traversing the environment during a second period of time, the second period of time being previous to the first period of time, wherein the second image data being captured at coordinates in the environment differing with less than a threshold distance from the coordinates indicated by the first geolocation data;
comparing the first image data with the second image data;
based at least in part on the comparison, for a portion of the first image data, determining a portion of the second image data differing with less than an image dissimilarity threshold from the portion of the first image data;
compressing the portion of the first image data into compressed image data at least by referring to the determined portion of the second image data in the compressed image data; and
storing the compressed image data.

2. The system of claim 1, wherein the instructions further cause the system to perform actions comprising:
varying the image dissimilarity threshold over a plurality of image data.

3. The system of claim 2, wherein the instructions further cause the system to perform actions comprising:
determining a label pertaining to a portion of the first image data;
determining the image dissimilarity threshold for the portion of the first image data based at least on the label, wherein the label indicates at least one of:
an image content type of the portion of the first image data;
motion data indicating motion detected in the part of the environment depicted in the portion of the first image data;
importance data indicating an importance of image content of the portion of the first image data for controlling an operation of the vehicle traversing the environment during the first period of time;
content of logs of the vehicle relating to the first period of time,
driving scenarios of the vehicle during the first period of time, or usability data indicating an intended use for the portion of the first image data.

4. The system of claim 1, wherein the instructions further cause the system to perform actions comprising:
receiving, from the camera of the vehicle traversing the environment during the first period of time, a first image, the first image being associated with the first geolocation data indicating coordinates in the environment where the first image was captured;
applying an image segmentation algorithm to the first image to detect a set of features; and
determining the first image data based at least in part on the detected set of features.

5. The system of claim 1, wherein the instructions further cause the system to perform actions comprising:
determining that the first image data differs with at least a third image dissimilarity threshold from any stored image data being captured at coordinates in the environment differing with less than a threshold distance from the coordinates indicated by the first geolocation data, and
storing at least parts of the first image data in the storage.

6. A computer-implemented method comprising:
retrieving first sensor data captured during a first period of time, the first sensor data being associated with first metadata indicating contextual information about the first sensor data, the first metadata comprising first geolocation data indicating coordinates in an environment where the first sensor data was captured;
retrieving second sensor data captured during a second period of time, the second period of time being different from the first period in time, the second sensor data being associated with second metadata indicating contextual information about the second sensor data, the second metadata comprising second geolocation data indicating coordinates in the environment where the second sensor data was captured;
comparing the first and second metadata data;
determining at least a subset of the second sensor data corresponding to at least a subset of the first sensor data based at least in part of the comparison between the first and second metadata data;
compressing the subset of the first sensor data into compressed sensor data at least by referencing the subset of the second sensor data in the compressed sensor data; and
storing the compressed sensor data.

7. The computer-implemented method of claim 6, wherein the first metadata indicates at least one of:
weather conditions in the environment while capturing the first sensor data;
a time of day when the first sensor data was captured;
object identifiers of objects of the environment captured in the first sensor data; or
configuration data relating to a sensor capturing the first sensor data;
and wherein the second metadata indicates at least one of:
weather conditions in the environment while capturing the second sensor data;
a time of day when the second sensor data was captured;
object identifiers of objects of the environment captured in the second sensor data; or
configuration data relating to a sensor capturing the second sensor data.

8. The computer-implemented method of claim 6, further comprising retrieving the second sensor data from a storage comprising a plurality of stored sensor data, each associated with a geolocation data indicating coordinates in the environment where the stored sensor data was captured, by:
from the plurality of stored sensor data, determining one or more stored sensor data geographically corresponding to the first sensor data by comparing the associated geolocation data of a stored sensor data with the first geolocation data and determining that the stored sensor data being captured at coordinates in the environment differing with less than a threshold distance from the coordinates indicated by the first geolocation data;

from the one or more stored sensor data geographically corresponding to the first sensor data, selecting the stored sensor data being most similar to the first sensor data among the plurality of stored sensor data; and based at least in part on determining that the most similar stored sensor data differs with less than a third data dissimilarity threshold from the first sensor data, retrieving the stored sensor data as the second sensor data.

9. The computer-implemented method of claim 6, further comprising:

comparing differences between subsets of the first sensor data and subsets of the second sensor data to a first data dissimilarity threshold; and determining the subset of the second sensor data corresponding to the subset of the first sensor data based at least in part on identifying that the subset of the first sensor data and the subset of the second sensor data differs with less than the first data dissimilarity threshold.

10. The computer-implemented method of claim 9, further comprising:

determining a varying first data dissimilarity threshold over a plurality of sensor data.

11. The computer-implemented method of claim 10, further comprising determining a label pertaining to a subset of the first sensor data;

determining the first data dissimilarity threshold for the subset of the first sensor data based at least on the label, wherein the label indicates at least one of:

a data content type of the subset of the first sensor data;

motion data indicating motion detected in the part of the environment represented by the subset of the first sensor data;

importance data indicating an importance of data content of the subset of the first sensor data for controlling an operation of an autonomous vehicle traversing the environment during the first period of time;

content of logs relating to the first period of time, the logs being associated with a sensor capturing the subset of the first sensor data;

driving scenarios of an autonomous vehicle traversing the environment during the first period of time, the autonomous vehicle associated with a sensor capturing the subset of the first sensor data; or usability data indicating an intended use for the subset of the first sensor data.

12. The computer-implemented method of claim 9, further comprising:

determining a difference data set between the subset of the first sensor data and the subset of the second sensor data; and compressing the difference data set and including the compressed difference data set in the compressed sensor data.

13. The computer-implemented method of claim 12, further comprising:

only upon the subset of the first sensor data and the subset of the second sensor data differs with more than a second data dissimilarity threshold, the second data dissimilarity threshold being lower compared to the first data dissimilarity threshold, compressing the difference data set and including the compressed difference data set in the compressed sensor data.

14. The computer-implemented method of claim 12, further comprising:

based at least in part on determining that the most similar stored sensor data differs with at least the third data dissimilarity threshold from the first sensor data, storing at least part of the first sensor data in the storage.

15. One or more non-transitory computer-readable media storing instructions executable by one or more processors, wherein the instructions, when executed, cause the one or more processors to perform operations comprising:

retrieving first sensor data captured during a first period of time, the first sensor data being associated with first metadata indicating contextual information about the first sensor data, the first metadata comprising first geolocation data indicating coordinates in an environment where the first sensor data was captured;

retrieving second sensor data captured during a second period of time, the second period of time being different from the first period in time, the second sensor data being associated with second metadata indicating contextual information about the second sensor data, the second metadata comprising second geolocation data indicating coordinates in the environment where the second sensor data was captured;

comparing the first and second metadata data;

determining at least a subset of the second sensor data corresponding to at least a subset of the first sensor data based at least in part of the comparison between the first and second metadata data;

compressing the subset of the first sensor data into compressed sensor data at least by referencing the subset of the second sensor data in the compressed sensor data; and storing the compressed sensor data.

16. The one or more non-transitory computer-readable media of claim 15, wherein the first metadata indicates at least one of:

weather conditions in the environment while capturing the first sensor data;

a time of day when the first sensor data was captured;

object identifiers of objects of the environment captured in the first sensor data; or configuration data relating to a sensor capturing the first sensor data;

and wherein the second metadata indicates at least one of:

weather conditions in the environment while capturing the second sensor data;

a time of day when the second sensor data was captured;

object identifiers of objects of the environment captured in the second sensor data; or configuration data relating to a sensor capturing the second sensor data.

17. The one or more non-transitory computer-readable media of claim 15, wherein the operations further comprise:

comparing differences between subsets of the first sensor data and subsets of the second sensor data to a first data dissimilarity threshold; and determining the subset of the second sensor data corresponding to the subset of the first sensor data based at least in part on identifying that the subset of the first sensor data and the subset of the second sensor data differs with less than the data dissimilarity threshold.

18. The one or more non-transitory computer-readable media of claim 17, wherein the operations further comprise:

determining a varying first data dissimilarity threshold over a plurality of sensor data.

19. The one or more non-transitory computer-readable media of claim 18, wherein the operations further comprise:
  determining a label pertaining to a subset of the first sensor data; and
  determining the first data dissimilarity threshold for the subset of the first sensor data based at least on the label, wherein the label indicates at least one of:
    a data content type of the subset of the first sensor data;
    motion data indicating motion detected in the part of the environment represented by the subset of the first sensor data;
    importance data indicating an importance of data content of the subset of the first sensor data for controlling an operation of an autonomous vehicle traversing the environment during the first period of time;
    content of logs relating to the first period of time, the logs being associated with a sensor capturing the subset of the first sensor data;
    driving scenarios of an autonomous vehicle traversing the environment during the first period of time, the autonomous vehicle associated with a sensor capturing the subset of the first sensor data; or
    usability data indicating an intended use for the subset of the first sensor data.

20. The one or more non-transitory computer-readable media of claim 17, wherein the operations further comprise:
  determining a difference data set between the subset of the first sensor data and the subset of the second sensor data; and
  compressing the difference data set and including the compressed difference data set in the compressed sensor data.

* * * * *